United States Patent
Jain et al.

(10) Patent No.: US 9,589,014 B2
(45) Date of Patent: *Mar. 7, 2017

(54) CREATING DATA IN A DATA STORE USING A DYNAMIC ONTOLOGY

(71) Applicant: Palantir Technologies, Inc., Palo Alto, CA (US)

(72) Inventors: Akash Jain, Mountain View, CA (US); Robert J. McGrew, Los Altos, CA (US); Nathan Gettings, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,680

(22) Filed: Nov. 30, 2015

(65) Prior Publication Data
US 2016/0154845 A1 Jun. 2, 2016

Related U.S. Application Data

(63) Continuation of application No. 14/508,696, filed on Oct. 7, 2014, now Pat. No. 9,201,920, which is a
(Continued)

(51) Int. Cl.
*G06F 17/30* (2006.01)
*G06F 17/27* (2006.01)

(52) U.S. Cl.
CPC .... *G06F 17/30424* (2013.01); *G06F 17/2705* (2013.01); *G06F 17/277* (2013.01);
(Continued)

(58) Field of Classification Search
CPC .................................. G06F 17/30424
(Continued)

(56) References Cited

U.S. PATENT DOCUMENTS 5,241,625 A  8/1993 Epard et al.
5,845,300 A  12/1998 Comer
(Continued)

FOREIGN PATENT DOCUMENTS

AU  2013251186  11/2015
CA  2666364  1/2015
(Continued)

OTHER PUBLICATIONS

Official Communication for Israel Patent Application No. 198253 dated Jan. 12, 2016.
(Continued)

*Primary Examiner* — Sheree Brown
(74) *Attorney, Agent, or Firm* — Hickman Palermo Becker Bingham LLP

(57) ABSTRACT

In one embodiment, a method comprises creating and storing an ontology for a data store in response to receiving first user input defining the ontology, wherein the ontology comprises a plurality of data object types and a plurality of object property types; creating one or more parser definitions in response to receiving second user input defining the parser definitions, wherein each of the parser definitions specifies one or more sub-definitions of how to transform first input data into modified input data that is compatible with one of the object property types; and storing each of the one or more parser definitions in association with one of the plurality of object property types.

20 Claims, 7 Drawing Sheets

Defining a Dynamic Ontology

Related U.S. Application Data continuation of application No. 13/916,447, filed on Jun. 12, 2013, now Pat. No. 8,856,153, which is a continuation of application No. 13/106,636, filed on May 12, 2011, now Pat. No. 8,489,623, which is a continuation of application No. 11/602,626, filed on Nov. 20, 2006, now Pat. No. 7,962,495.

(52) U.S. Cl.
CPC .... *G06F 17/2725* (2013.01); *G06F 17/30289* (2013.01); *G06F 17/30297* (2013.01); *G06F 17/30312* (2013.01); *G06F 17/30371* (2013.01); *G06F 17/30734* (2013.01)

(58) Field of Classification Search
USPC .......................................................... 707/755
See application file for complete search history.

(56) References Cited

U.S. PATENT DOCUMENTS

| | | |
|---|---|---|
| 5,999,911 A | 12/1999 | Berg et al. |
| 6,065,026 A | 5/2000 | Cornelia et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,289,338 B1 | 9/2001 | Stoffel et al. |
| 6,370,538 B1 | 4/2002 | Lamping et al. |
| 6,430,305 B1 | 8/2002 | Decker |
| 6,463,404 B1 | 10/2002 | Appleby |
| 6,523,019 B1 | 2/2003 | Borthwick |
| 6,523,172 B1* | 2/2003 | Martinez-Guerra .... G06F 8/427 704/9 |
| 6,539,538 B1 | 3/2003 | Brewster et al. |
| 6,640,231 B1 | 10/2003 | Andersen et al. |
| 6,665,683 B1 | 12/2003 | Meltzer |
| 6,748,481 B1 | 6/2004 | Parry et al. |
| 6,850,317 B2 | 2/2005 | Mullins et al. |
| 6,877,137 B1 | 4/2005 | Rivette et al. |
| 6,944,821 B1 | 9/2005 | Bates et al. |
| 6,967,589 B1 | 11/2005 | Peters |
| 7,027,974 B1 | 4/2006 | Busch et al. |
| 7,086,028 B1 | 8/2006 | Davis et al. |
| 7,089,541 B2 | 8/2006 | Ungar |
| 7,174,377 B2 | 2/2007 | Bernard et al. |
| 7,194,680 B1 | 3/2007 | Roy et al. |
| 7,213,030 B1 | 5/2007 | Jenkins |
| 7,237,192 B1 | 6/2007 | Stephenson et al. |
| 7,240,330 B2 | 7/2007 | Fairweather |
| 7,392,254 B1 | 6/2008 | Jenkins |
| 7,441,182 B2 | 10/2008 | Beilinson et al. |
| 7,441,219 B2 | 10/2008 | Perry et al. |
| 7,533,069 B2 | 5/2009 | Fairweather |
| 7,685,083 B2 | 3/2010 | Fairweather |
| 7,765,489 B1 | 7/2010 | Shah |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,958,147 B1 | 6/2011 | Turner et al. |
| 7,962,495 B2 | 6/2011 | Jain et al. |
| 7,966,199 B1 | 6/2011 | Frasher et al. |
| 8,010,507 B2 | 8/2011 | Poston et al. |
| 8,073,857 B2 | 12/2011 | Sreekanth |
| 8,117,022 B2 | 2/2012 | Linker |
| 8,132,149 B2 | 3/2012 | Shenfield et al. |
| 8,271,948 B2 | 9/2012 | Talozi et al. |
| 8,290,838 B1 | 10/2012 | Thakur et al. |
| 8,302,855 B2 | 11/2012 | Ma et al. |
| 8,489,623 B2 | 7/2013 | Jain et al. |
| 8,560,494 B1 | 10/2013 | Downing et al. |
| 8,682,696 B1 | 3/2014 | Shanmugam |
| 8,688,573 B1 | 4/2014 | Rukonic et al. |
| 8,689,182 B2 | 4/2014 | Leithead et al. |
| 8,732,574 B2 | 5/2014 | Burr et al. |
| 8,799,313 B2 | 8/2014 | Satlow |
| 8,807,948 B2 | 8/2014 | Luo et al. |
| 8,855,999 B1 | 10/2014 | Elliot |
| 8,903,717 B2 | 12/2014 | Elliot |
| 8,930,874 B2 | 1/2015 | Duff et al. |
| 8,930,897 B2 | 1/2015 | Nassar |
| 8,938,686 B1 | 1/2015 | Erenrich et al. |
| 8,984,390 B2 | 3/2015 | Aymeloglu et al. |
| 9,009,827 B1 | 4/2015 | Albertson et al. |
| 9,058,315 B2 | 6/2015 | Burr et al. |
| 9,165,100 B2 | 10/2015 | Begur et al. |
| 9,201,920 B2 | 12/2015 | Jain et al. |
| 9,223,773 B2 | 12/2015 | Isaacson |
| 2002/0032677 A1 | 3/2002 | Morgenthaler et al. |
| 2002/0095360 A1 | 7/2002 | Joao |
| 2002/0103705 A1 | 8/2002 | Brady |
| 2002/0194201 A1* | 12/2002 | Wilbanks .............. G06F 19/709 |
| 2002/0196229 A1 | 12/2002 | Chen et al. |
| 2003/0036927 A1 | 2/2003 | Bowen |
| 2003/0093755 A1 | 5/2003 | O'Carroll |
| 2003/0126102 A1 | 7/2003 | Borthwick |
| 2003/0172053 A1 | 9/2003 | Fairweather |
| 2003/0177112 A1* | 9/2003 | Gardner .................. G06F 19/28 |
| 2004/0034570 A1 | 2/2004 | Davis |
| 2004/0044648 A1 | 3/2004 | Anfindsen et al. |
| 2004/0044992 A1 | 3/2004 | Muller et al. |
| 2004/0083466 A1* | 4/2004 | Dapp ...................... G06F 8/427 717/143 |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0091186 A1 | 4/2005 | Elish |
| 2005/0091420 A1 | 4/2005 | Snover et al. |
| 2005/0125715 A1 | 6/2005 | Franco et al. |
| 2005/0183005 A1 | 8/2005 | Denoue et al. |
| 2006/0026561 A1 | 2/2006 | Bauman et al. |
| 2006/0031779 A1 | 2/2006 | Theurer et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0080139 A1 | 4/2006 | Mainzer |
| 2006/0123027 A1* | 6/2006 | Kohlhammer .... G06F 17/30734 |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0218163 A1 | 9/2006 | Marcjan et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0043686 A1 | 2/2007 | Teng et al. |
| 2007/0061752 A1 | 3/2007 | Cory |
| 2007/0074169 A1 | 3/2007 | Chess et al. |
| 2007/0078872 A1 | 4/2007 | Cohen |
| 2007/0112714 A1 | 5/2007 | Fairweather |
| 2007/0113164 A1 | 5/2007 | Hansen et al. |
| 2007/0136095 A1 | 6/2007 | Weinstein |
| 2007/0168871 A1 | 7/2007 | Jenkins |
| 2007/0185850 A1 | 8/2007 | Walters et al. |
| 2007/0233709 A1 | 10/2007 | Abnous |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0091693 A1 | 4/2008 | Murthy |
| 2008/0109714 A1 | 5/2008 | Kumar et al. |
| 2008/0140387 A1 | 6/2008 | Linker |
| 2008/0148398 A1 | 6/2008 | Mezack et al. |
| 2008/0172607 A1 | 7/2008 | Baer |
| 2008/0177782 A1 | 7/2008 | Poston et al. |
| 2008/0228467 A1 | 9/2008 | Womack et al. |
| 2008/0249820 A1 | 10/2008 | Pathria |
| 2008/0281580 A1 | 11/2008 | Zabokritski |

(56) References Cited

U.S. PATENT DOCUMENTS

| | | |
|---|---|---|
| 2008/0313132 A1 | 12/2008 | Hao et al. |
| 2008/0313243 A1 | 12/2008 | Poston et al. |
| 2009/0031401 A1 | 1/2009 | Cudich et al. |
| 2009/0043801 A1 | 2/2009 | LeClair |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0172821 A1 | 7/2009 | Daira et al. |
| 2009/0177962 A1 | 7/2009 | Gusmorino et al. |
| 2009/0187546 A1 | 7/2009 | Whyte et al. |
| 2009/0199106 A1 | 8/2009 | Jonsson et al. |
| 2009/0248757 A1 | 10/2009 | Havewala et al. |
| 2009/0249178 A1 | 10/2009 | Ambrosino et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0011282 A1 | 1/2010 | Dollard et al. |
| 2010/0057622 A1 | 3/2010 | Faith et al. |
| 2010/0070844 A1 | 3/2010 | Aymeloglu et al. |
| 2010/0098318 A1 | 4/2010 | Anderson |
| 2010/0204983 A1 | 8/2010 | Chung et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306285 A1 | 12/2010 | Shah et al. |
| 2010/0313119 A1 | 12/2010 | Baldwin et al. |
| 2010/0313239 A1 | 12/2010 | Chakra et al. |
| 2011/0047540 A1 | 2/2011 | Williams et al. |
| 2011/0074788 A1 | 3/2011 | Regan et al. |
| 2011/0093327 A1 | 4/2011 | Fordyce et al. |
| 2011/0099133 A1 | 4/2011 | Chang et al. |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0225482 A1 | 9/2011 | Chan et al. |
| 2011/0258216 A1 | 10/2011 | Supakkul et al. |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0084117 A1 | 4/2012 | Tavares et al. |
| 2012/0084184 A1 | 4/2012 | Raleigh |
| 2012/0123989 A1 | 5/2012 | Yu et al. |
| 2012/0137235 A1 | 5/2012 | T S et al. |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0221553 A1 | 8/2012 | Wittmer et al. |
| 2012/0226590 A1 | 9/2012 | Love et al. |
| 2012/0284670 A1 | 11/2012 | Kashik et al. |
| 2012/0304150 A1 | 11/2012 | Leithead et al. |
| 2013/0016106 A1 | 1/2013 | Yip et al. |
| 2013/0024268 A1 | 1/2013 | Manickavelu |
| 2013/0086482 A1 | 4/2013 | Parsons |
| 2013/0091084 A1 | 4/2013 | Lee |
| 2013/0124193 A1 | 5/2013 | Holmberg |
| 2013/0151305 A1 | 6/2013 | Akinola et al. |
| 2013/0151453 A1 | 6/2013 | Bhanot et al. |
| 2013/0166480 A1 | 6/2013 | Popescu et al. |
| 2013/0225212 A1 | 8/2013 | Khan |
| 2013/0251233 A1 | 9/2013 | Yang et al. |
| 2013/0275446 A1 | 10/2013 | Jain et al. |
| 2014/0047319 A1 | 2/2014 | Eberlein |
| 2014/0129936 A1 | 5/2014 | Richards et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0358829 A1 | 12/2014 | Hurwitz |
| 2015/0026622 A1 | 1/2015 | Roaldson et al. |
| 2015/0046481 A1 | 2/2015 | Elliot |
| 2015/0073954 A1 | 3/2015 | Braff |
| 2015/0089353 A1 | 3/2015 | Folkening |
| 2015/0100559 A1 | 4/2015 | Nassar |
| 2015/0106379 A1 | 4/2015 | Elliot et al. |
| 2015/0142766 A1 | 5/2015 | Jain et al. |
| 2015/0212663 A1 | 7/2015 | Papale et al. |
| 2015/0254220 A1 | 9/2015 | Burr et al. |
| 2015/0261847 A1 | 9/2015 | Ducott et al. |
| 2016/0062555 A1 | 3/2016 | Ward et al. |

FOREIGN PATENT DOCUMENTS

| | | |
|---|---|---|
| CN | 102054015 | 5/2014 |
| DE | 102014204840 | 9/2014 |
| DE | 102014215621 | 2/2015 |
| EP | 1 672 527 | 6/2006 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 2993595 | 3/2016 |
| GB | 2366498 | 3/2002 |
| GB | 2513007 | 10/2014 |
| GB | 2518745 | 4/2015 |
| IL | 198253 | 6/2016 |
| NL | 2013306 | 2/2015 |
| WO | WO 01/25906 | 4/2001 |
| WO | WO 01/88750 | 11/2001 |
| WO | WO 02/35376 | 5/2002 |
| WO | WO 03/060751 | 7/2003 |
| WO | WO 2007/133206 | 11/2007 |
| WO | WO 2008/064207 | 5/2008 |
| WO | WO 2010/030913 | 3/2010 |
| WO | WO 2010/030914 | 3/2010 |
| WO | WO 2011/071833 | 6/2011 |
| WO | WO 2012/119008 | 9/2012 |

OTHER PUBLICATIONS

Claims for Israel Patent Application No. 198253 dated Jan. 2016, 8 pages.

Official Communication for Great Britain Patent Application No. 1413935.6 dated Dec. 21, 2015.

Official Communication for Netherlands Patent Application No. 2012434 dated Jan. 8, 2016.

U.S. Appl. No. 14/134,558, filed Dec. 19, 2013, Office Action, Oct. 7, 2015.

U.S. Appl. No. 14/526,066, filed Oct. 28, 2014, Office Action, Jan. 21, 2016.

U.S. Appl. No. 14/025,653, filed Sep. 12, 2013, Interview, Mar. 3, 2016.

U.S. Appl. No. 14/631,633, filed Feb. 25, 2015, First Office, Feb. 3, 2016.

"A Tour of Pinboard," <http://pinboard.in/tour> as printed May 15, 2014 in 6 pages.

"BackTult—JD Edwards One World Version Control System," printed Jul. 23, 2007 in 1 page.

Delicious, <http://delicious.com/> as printed May 15, 2014 in 1 page.

Geiger, Jonathan G., "Data Quality Management, the Most Critical Initiative You Can Implement," Data Warehousing, Management and Quality, Paper 098-29, SUGI 29, Intelligent Solutions, Inc., Bounder, CO, pp. 14, accessed Oct. 3, 2013.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Klemmer et al., "Where Do Web Sites Come From? Capturing and Interacting with Design History," Association for Computing Machinery, CHI 2002, Apr. 20-25, 2002, Minneapolis, MN, pp. 8.

(56) References Cited

OTHER PUBLICATIONS

Kokossi et al., "D7-Dynamic Ontoloty Management System (Design)," Information Societies Technology Programme, Jan. 10, 2002, pp. 1-27.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nivas, Tuli, "Test Harness and Script Design Principles for Automated Testing of non-GUI or Web Based Applications," Performance Lab, Jun. 2011, pp. 30-37.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Symantec Corporation, "E-Security Begins with Sound Security Policies," Announcement Symantec, Jun. 14, 2001.
Wollrath et al., "A Distributed Object Model for the Java System," Conference on Object-Oriented Technologies and Systems, Jun. 17-21, 1996, pp. 219-231.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622414 dated Mar. 24, 2014.
Official Communication for New Zealand Patent Application No. 622497 dated Mar. 26, 2014.
Official Communication for New Zealand Patent Application No. 622484 dated Apr. 2, 2014.
Official Communication for New Zealand Patent Application No. 622513 dated Apr. 3, 2014.
Official Communication for European Patent Application No. 14158958.0 dated Jun. 3, 2014.
Official Communication for Canadian Patent Application No. 2666364 dated Jun. 4, 2012.
Official Communication for European Patent Application No. 14158977.0 dated Jun. 10, 2014.
Official Communication for New Zealand Patent Application No. 622497 dated Jun. 19, 2014.
Official Communication for European Patent Application No. 14159629.6 dated Jul. 31, 2014.
Official Communication for Great Britain Patent Application No. 1404479.6 dated Aug. 12, 2014.
Official Communication for Israel Patent Application No. 198253 dated Nov. 24, 2014.
Official Communication for Great Britain Patent Application No. 1413935.6 dated Jan. 27, 2015.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201580 dated Feb. 27, 2015.
Official Communication for European Patent Application No. 14158977.0 dated Apr. 16, 2015.
Official Communication for European Patent Application No. 14158958.0 dated Apr. 16, 2015.
Official Communication for Netherlands Patent Application No. 2013306 dated Apr. 24, 2015.
Official Communication for Great Britain Patent Application No. 1404479.6 dated Jul. 9, 2015.
U.S. Appl. No. 14/508,696, filed Oct. 7, 2014, Office Action, Mar. 2, 2015.
U.S. Appl. No. 14/508,696, filed Oct. 7, 2014, Notice of Allowance, Jul. 27, 2015.
U.S. Appl. No. 14/148,568, filed Jan. 6, 2014, Final Office Action, Oct. 22, 2014.
U.S. Appl. No. 14/148,568, filed Jan. 6, 2014, Office Action, Mar. 26, 2015.
U.S. Appl. No. 14/025,653, filed Sep. 12, 2013, Office Action Interview, Oct. 6, 2015.
U.S. Appl. No. 14/044,800, filed Oct. 2, 2013, Notice of Allowance, Sep. 2, 2014.
U.S. Appl. No. 14/148,568, filed Jan. 6, 2014, Notice of Allowance, Aug. 26, 2015.
U.S. Appl. No. 14/533,433, filed Nov. 5, 2014, Notice of Allowance, Sep. 1, 2015.
Abbey, Kristen, "Review of Google Docs," May 1, 2007, pp. 2.
Official Communication for Canadian Patent Application No. 2831660 dated Jun. 9, 2015.
Online Tech Tips, "Clip2Net—Share files, folders and screenshots easily," <http://www.online-tech-tips.com/free-software-downloads/share-files-foldersscreenshots/>, Apr. 2, 2008, pp. 5.
Official Communication for European Patent Application No. 15190307.7 dated Feb. 19, 2016.
Official Communication for European Patent Application No. 15188106.7 dated Feb. 3, 2016.
Chaudhuri et al., "An Overview of Business Intelligence Technology," Communications of the ACM, Aug. 2011, vol. 54, No. 8.
Official Communication for New Zealand Patent Application No. 628161 dated Aug. 25, 2014.
Official Communication for Netherlands Patent Application No. 2012438 dated Sep. 21, 2015.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Official Communication for Great Britain Patent Application No. 1404486.1 dated Aug. 27, 2014.
"GrabUp—What a Timesaver!" <http://atlchris.com/191/grabup/>, Aug. 11, 2008, pp. 3.
Microsoft, "Registering an Application to a URI Scheme," <http://msdn.microsoft.com/en-us/library/aa767914.aspx>, printed Apr. 4, 2009 in 4 pages.
Official Communication for European Patent Application No. 15155845.9 dated Oct. 6, 2015.
Official Communication for Netherlands Patent Application No. 2011729 dated Aug. 13, 2015.
Schroder, Stan, "15 Ways to Create Website Screenshots," <http://mashable.com/2007/08/24/web-screenshots/>, Aug. 24, 2007, pp. 2.
Official Communication for New Zealand Patent Application No. 622473 dated Jun. 19, 2014.
Official Communication for Great Britain Patent Application No. 1404499.4 dated Aug. 20, 2014.
JetScreenshot.com, "Share Screenshots via Internet in Seconds," <http://web.archive.org/web/20130807164204/http://www.jetscreenshot.com/>, Aug. 7, 2013, pp. 1.
Microsoft Windows, "Microsoft Windows Version 2002 Print Out 2," 2002, pp. 1-6.

(56) References Cited

OTHER PUBLICATIONS

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Bluttman et al., "Excel Formulas and Functions for Dummies," 2005, Wiley Publishing, Inc., pp. 280, 284-286.

SnagIt, "SnagIt 8.1.0 Print Out," Software release date Jun. 15, 2006, pp. 6.

Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.

Gu et al., "Record Linkage: Current Practice and Future Directions," Jan. 15, 2004, pp. 32.

Official Communication for Great Britain Patent Application No. 1404489.5 dated Aug. 27, 2014.

Official Communication for Australian Patent Application No. 2013251186 dated Mar. 12, 2015.

Hua et al., "A Multi-attribute Data Structure with Parallel Bloom Filters for Network Services", HiPC 2006, LNCS 4297, pp. 277-288, 2006.

Notice of Acceptance for Australian Patent Application No. 2013251186 dated Nov. 6, 2015.

Microsoft, "Using the Clipboard," <http://msdn.microsoft.com/en-us/library/ms649016.aspx>, printed Jun. 8, 2009 in 20 pages.

Official Communication for European Patent Application No. 12181585.6 dated Sep. 4, 2015.

Galliford, Miles, "SnagIt Versus Free Screen Capture Software: Critical Tools for Website Owners," <http://www.subhub.com/articles/free-screen-capture-software>, Mar. 27, 2008, pp. 11.

SnagIt, "SnagIt 8.1.0 Print Out 2," Software release date Jun. 15, 2006, pp. 1-3.

O'Reilly.com, http://oreilly.com/digitalmedia/2006/01/01/mac-os-x-screenshot-secrets.html published Jan. 1, 2006 in 10 pages.

Davis, "Combining a Flexible Data Model and Phase Schema Translation in Data Model Reverse Engineering," dated 1996, IEEE, 12 pages.

Maluf et al., "An Extenible Schema-Less Database Framework for Managing High-Throughpit Structured Documents," Proceedings of the lasted International Conference, dated May 21, 2003, pp. 225-230.

Official Communicaiton for European Patent Application No. 07864644.5 dated Jul. 12, 2016, 10 pages.

Claims for European Patent Application No. 07864644.5 dated Jul. 2016, 4 pages.

Conner, Nancy, "Google Apps: The Missing Manual," May 1, 2008, pp. 15.

Wang et al., "Research on a Clustering Data De-Duplication Mechanism Based on Bloom Filter," IEEE 2010, 5 pages.

Warren, Christina, "TUAW Faceoff: Screenshot apps on the firing line," <http://www.tuaw.com/2008/05/05/tuaw-faceoff-screenshot-apps-on-the-firing-lineh, May 5, 2008, pp. 11.

U.S. Appl. No. 14/265,637, filed Apr. 30, 2014, Notice of Allowance, Feb. 13, 2015.

U.S. Appl. No. 14/552,336, filed Nov. 24, 2014, Notice of Allowance, Nov. 3, 2015.

U.S. Appl. No. 14/741,256, filed Jun. 16, 2015, Office Action, Feb. 9, 2016.

U.S. Appl. No. 14/571,098, filed Dec. 15, 2014, First Office Action Interview, Mar. 11, 2015.

U.S. Appl. No. 14/871,465, filed Sep. 30, 2015, First Office Action Interview, Feb. 9, 2016.

U.S. Appl. No. 13/827,491, filed Mar. 14, 2013, Final Office Action, Jun. 22, 2015.

U.S. Appl. No. 14/552,336, filed Nov. 24, 2014, First Office Action Interview, Jul. 20, 2015.

U.S. Appl. No. 12/556,321, filed Sep. 9, 2009, Final Office Action, Feb. 25, 2016.

U.S. Appl. No. 14/715,834, filed May 19, 2015, First Office Action Interview, Feb. 19, 2016.

U.S. Appl. No. 14/571,098, filed Dec. 15, 2014, First Office Action Interview, Aug. 24, 2015.

U.S. Appl. No. 12/556,321, filed Sep. 9, 2009, Office Action, Jul. 7, 2015.

U.S. Appl. No. 14/841,338, filed Aug. 31, 2015, Office Action, Feb. 18, 2016.

U.S. Appl. No. 13/669,274, filed Nov. 5, 2012, Final Office Action, May 6, 2015.

U.S. Appl. No. 14/842,734, filed Sep. 1, 2015, First Office Action Interview, Nov. 19, 2015.

U.S. Appl. No. 14/800,447, filed Jul. 15, 2012, First Office Action Interview, Dec. 10, 2010.

U.S. Appl. No. 14/571,098, filed Dec. 15, 2014, First Office Action Interview, Nov. 10, 2015.

U.S. Appl. No. 14/883,498, filed Oct. 14, 2015, First Office Action Interview, Dec. 24, 2015.

U.S. Appl. No. 13/669,274, filed Nov. 5, 2012, Advisory Action Aug. 26, 2015.

U.S. Appl. No. 14/222,364, filed Mar. 21, 2014, Office Action, Dec. 9, 2015.

U.S. Appl. No. 13/827,491, filed Mar. 14, 2013, Office Action, Oct. 9, 2015.

* cited by examiner

Defining a Dynamic Ontology

Transforming Data Using a Dynamic Ontology

CREATING DATA IN A DATA STORE USING A DYNAMIC ONTOLOGY

BENEFIT CLAIM

The present application claims the benefit under 35 U.S.C. §120 as a continuation of application Ser. No. 14/508,696, filed Oct. 7, 2014, now U.S. Pat. No. 9,201,920, which is a continuation of application Ser. No. 13/916,447, filed Jun. 12, 2013, now U.S. Pat. No. 8,856,153, which is a continuation of application Ser. No. 13/106,636, filed May 12, 2011, now U.S. Pat. No. 8,489,623, which is a continuation of application Ser. No. 11/602,626, filed Nov. 20, 2006, now U.S. Pat. No. 7,962,495, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure generally relates to techniques for creating data in a data store.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based database systems, such as relational database management systems, typically organize data according to a fixed structure of tables and relationships. The structure may be described using an ontology, embodied in a database schema, comprising a data model that is used to represent the structure and reason about objects in the structure.

An ontology of a database is normally fixed at the time that the database is created. Any change in the ontology represented by the schema is typically extremely disruptive to the database system and requires a database administrator to modify tables or relationships, or create new tables or relationships.

The rigidity of the typical database ontology is a serious drawback for organizations that require flexible and dynamic data processing techniques according to changes in the data that is collected. For example, intelligence analysis is poorly suited to conventional fixed ontology systems.

SUMMARY

In one embodiment, a method comprises creating and storing an ontology for a data store in response to receiving first user input defining the ontology, wherein the ontology comprises a plurality of data object types and a plurality of object property types; creating one or more parser definitions in response to receiving second user input defining the parser definitions, wherein each of the parser definitions specifies one or more sub-definitions of how to transform first input data into modified input data that is compatible with one of the object property types; storing each of the one or more parser definitions in association with one of the plurality of object property types; wherein the machine-executed operation is at least one of (a) sending said instructions over transmission media, (b) receiving said instructions over transmission media, (c) storing said instructions onto a machine-readable storage medium, and (d) executing the instructions.

In one feature, the method further comprises receiving the first input data; determining whether the first input data matches one of the parser sub-definitions; using a matching one of the parser sub-definitions, creating and storing the modified input data; storing the modified input data in a property of the property type that is identified in the matching one of the parser sub-definitions.

In another feature, creating and storing one or more parser definitions comprises creating and storing one or more program code modules, wherein each of the code modules comprises computer program code which when executed causes transforming the first input data into the modified input data.

In another feature, creating and storing one or more parser definitions comprises creating and storing one or more transformation expressions, wherein each of the transformation expressions comprises one or more syntactic patterns and a property type identifier associated with each of the syntactic patterns.

In yet another feature, creating and storing one or more parser definitions comprises creating and storing one or more transformation expressions, wherein each of the transformation expressions comprises one or more syntactic patterns and a property type identifier associated with each of the syntactic patterns, and the method further comprises receiving the first input data; determining whether the first input data matches one of the syntactic patterns; using a matching one of the syntactic patterns, creating and storing modified input data; storing the modified input data in a property of the property type that is identified by the property type identifier associated with the matching one of the syntactic patterns.

In still another feature, creating one or more parser definitions comprises creating one or more parser definitions comprising a constraint on what modified input data is acceptable for creation of a property of one of the object property types. In a further feature, creating one or more parser definitions comprises creating one or more parser definitions comprising a default value to substitute for one component of the modified input data.

In another feature, the method further comprises receiving the first input data; determining whether the first input data matches successive different ones of the parser sub-definitions until a matching parser sub-definition is identified; using a matching one of the parser sub-definitions, creating and storing the modified input data; storing the modified input data in a property of the property type that is identified in the matching one of the parser sub-definitions.

According to another embodiment, a data storage system comprises a data store; an ontology coupled to the data store and comprising a plurality of data object types and a plurality of object property types; a parser coupled to the ontology and configured to receive input data and transform the input data into modified data to store in a property of one of the property types according to one or more parser definitions; wherein each of the object property types comprises one or more of the parser definitions, wherein each of the parser definitions specifies one or more sub-definitions of how to transform first input data into modified input data that is compatible with one of the object property types.

According to another embodiment, an apparatus comprises means for creating and storing an ontology for a data store in response to receiving first user input defining the ontology, wherein the ontology comprises a plurality of data object types and a plurality of object property types; means for creating one or more parser definitions in response to receiving second user input defining the parser definitions, wherein each of the parser definitions specifies one or more sub-definitions of how to transform first input data into modified input data that is compatible with one of the object property types; and means for storing each of the one or more parser definitions in association with one of the plurality of object property types.

In another embodiment, a graphical user interface comprises an expression pattern field configured to accept user input specifying a transformation expression pattern that specifies how to transform first input data into modified input data; one or more parser sub-definitions each comprising: a portion of the transformation expression pattern; a combo box configured to accept user input specifying one of a plurality of object property component types of an ontology of a data store; wherein each of the parser sub-definitions specifies how to transform a portion of the first input data into a portion of modified input that can be stored in the specified component of one of the plurality of object property types.

In one feature, the one or more parser sub-definitions comprise a constraint on how to transform the portion of the first input data into the portion of modified input data that is compatible with one of the object property types. In yet another feature, the one or more parser sub-definitions comprise a default value to substitute for the modified input data if it is empty.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. In an embodiment, a user of a database system specifies an ontology of the database in terms of object types and property types for properties of the objects. The user further specifies how to parse input data for the database and how to map the parsed data into database elements such as objects or object properties. The database is chosen as an example embodiment, other embodiments such as flat files or search indexes could be considered as well.

I. Dynamic Ontology Database System

Figure 1:
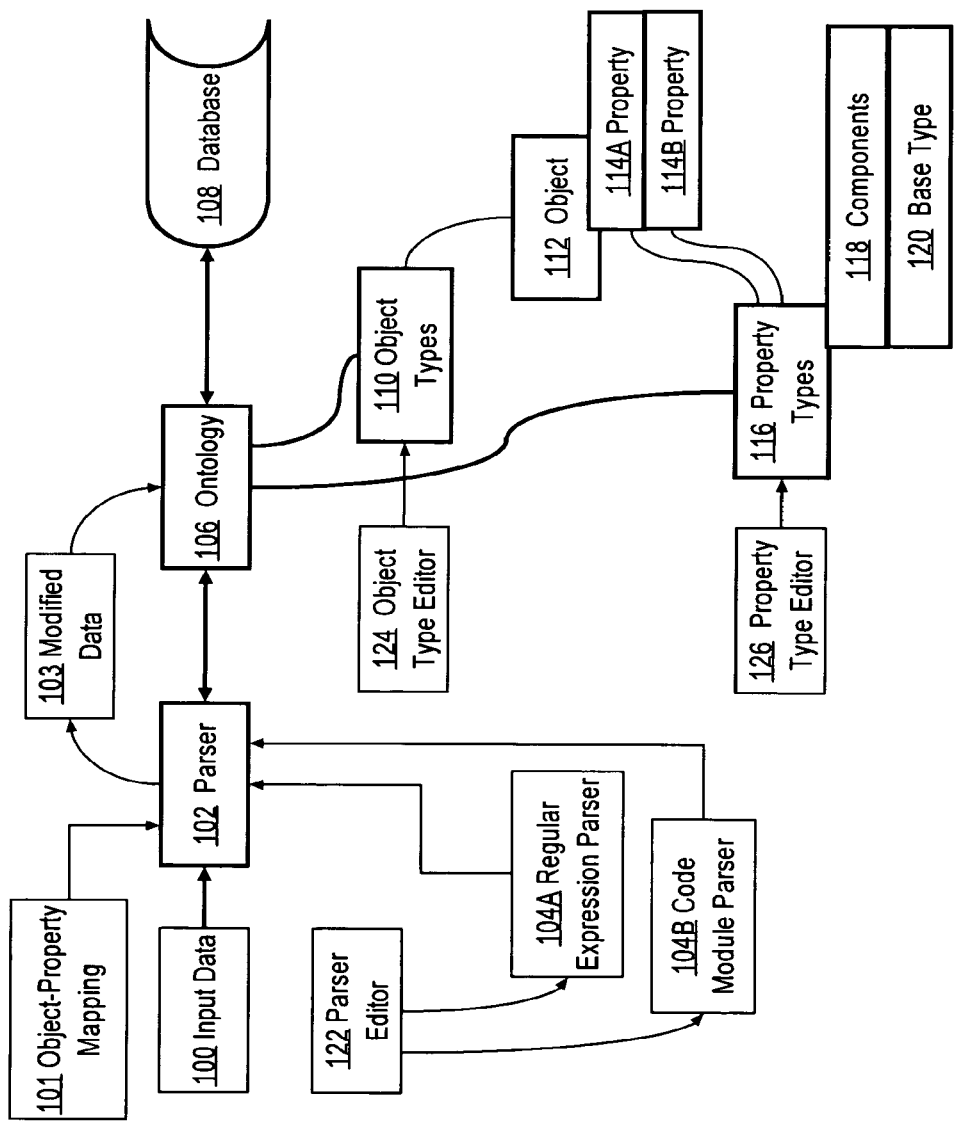
FIG. 1 illustrates a system for creating data in a data store using a dynamic ontology.

FIG. 1 illustrates a system for creating data in a database using a dynamic ontology. A parser 102 is coupled to an ontology 106, which is coupled to a database 108. In an embodiment, ontology 106 comprises stored information providing a data model of data stored in database 108, and the ontology is defined by one or more object types 110 and one or more property types 116. One or more objects 112 in the database 108 may be instantiated based on the object types 110, and each of the objects has one or more properties 114A, 114B that are instantiated based on property types 116. The property types 116 each may comprise one or more components 118, such as a string, number, etc. Property types 116 may be instantiated based on a base type 120. For example, a base type 120 may be "Locations" and a property type 116 may be "Home."

In an embodiment, a user of the system uses an object type editor 124 to create the object types 110 and define attributes of the object types. In an embodiment, a user of the system uses a property type editor 126 to create the property types 116 and define attributes of the property types.

In an embodiment, creating a property type 116 using the property type editor 126 involves defining at least one parser definition using a parser editor 122. A parser definition comprises metadata that informs parser 102 how to parse input data 100 to determine whether values in the input data can be assigned to the property type 116 that is associated with the parser definition. In an embodiment, each parser definition may comprise a regular expression parser 104A or a code module parser 104B. In other embodiments, other kinds of parser definitions may be provided using scripts or other programmatic elements. The elements of a regular expression parser 104A and a code module parser 104B are described further in subsequent sections. Once defined, both a regular expression parser 104A and a code module parser 104B can provide input to parser 102 to control parsing of input data 100.

In one embodiment of using the system of FIG. 1, input data 100 is provided to parser 102. An object-property mapping for the input data 100 enables the parser to determine which object type 110 should receive data from a row of the input data, and which property types 116 should receive data from individual field values in the input data. Based on the object-property mapping 101, the parser 102 selects one of the parser definitions that is associated with a property type in the input data. The parser parses an input data field using the selected parser definition, resulting in creating modified data 103. The modified data 103 is added to the database 108 according to ontology 106 by storing values of the modified data in a property of the specified property type. As a result, input data 100 having varying format or syntax can be created in database 108. The ontology 106 may be modified at any time using object type editor 124 and property type editor 126. Parser editor 122 enables creating multiple parser definitions that can successfully parse input data 100 having varying format or syntax and determine which property types should be used to transform input data 100 into modified input data 103.

II. Defining a Dynamic Ontology

Figure 2:
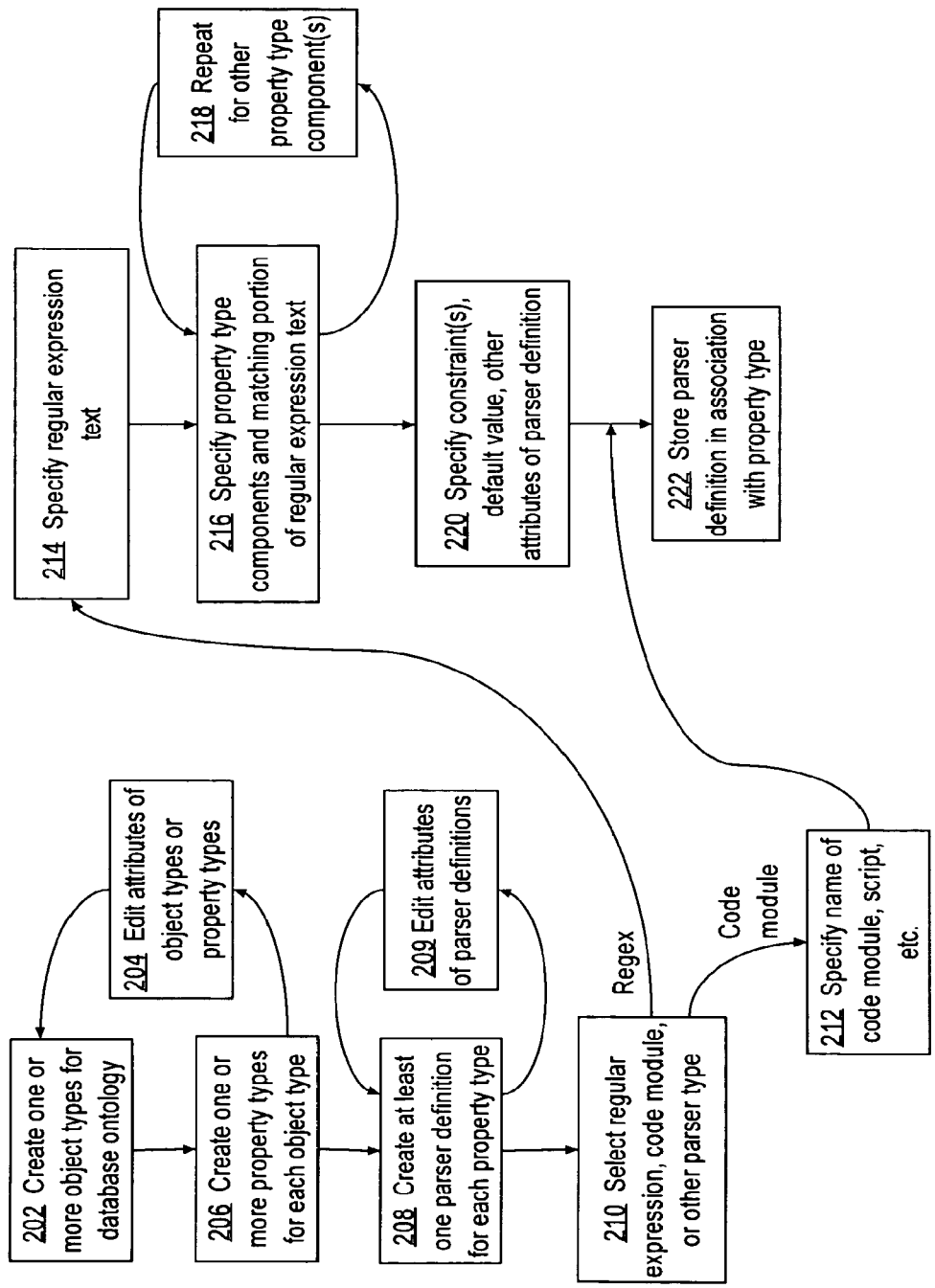
FIG. 2 illustrates defining a dynamic ontology for use in creating data in a data store.

FIG. 2 illustrates defining a dynamic ontology for use in creating data in a database. For purposes of illustrating a clear example, steps 202-209 of FIG. 2 are first described at a high level, and details of an example implementation follow the high level description.

In step 202, one or more object types are created for a database ontology. In step 206, one or more property types are created for each object type. As indicated in step 204, the attributes of object types or property types of the ontology may be edited or modified at any time.

In step 208, at least one parser definition is created for each property type. At step 209, attributes of a parser definition may be edited or modified at any time.

In an embodiment, each property type is declared to be representative of one or more object types. A property type is representative of an object type when the property type is intuitively associated with the object type. For example, a property type of "Social Security Number" may be representative of an object type "Person" but not representative of an object type "Business."

In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane". An example parser definition specifies an association of input data to object property components as follows: {LAST_NAME}, {FIRST_NAME}→Name:Last, Name:First. In an embodiment, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane". The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

Figure 4:
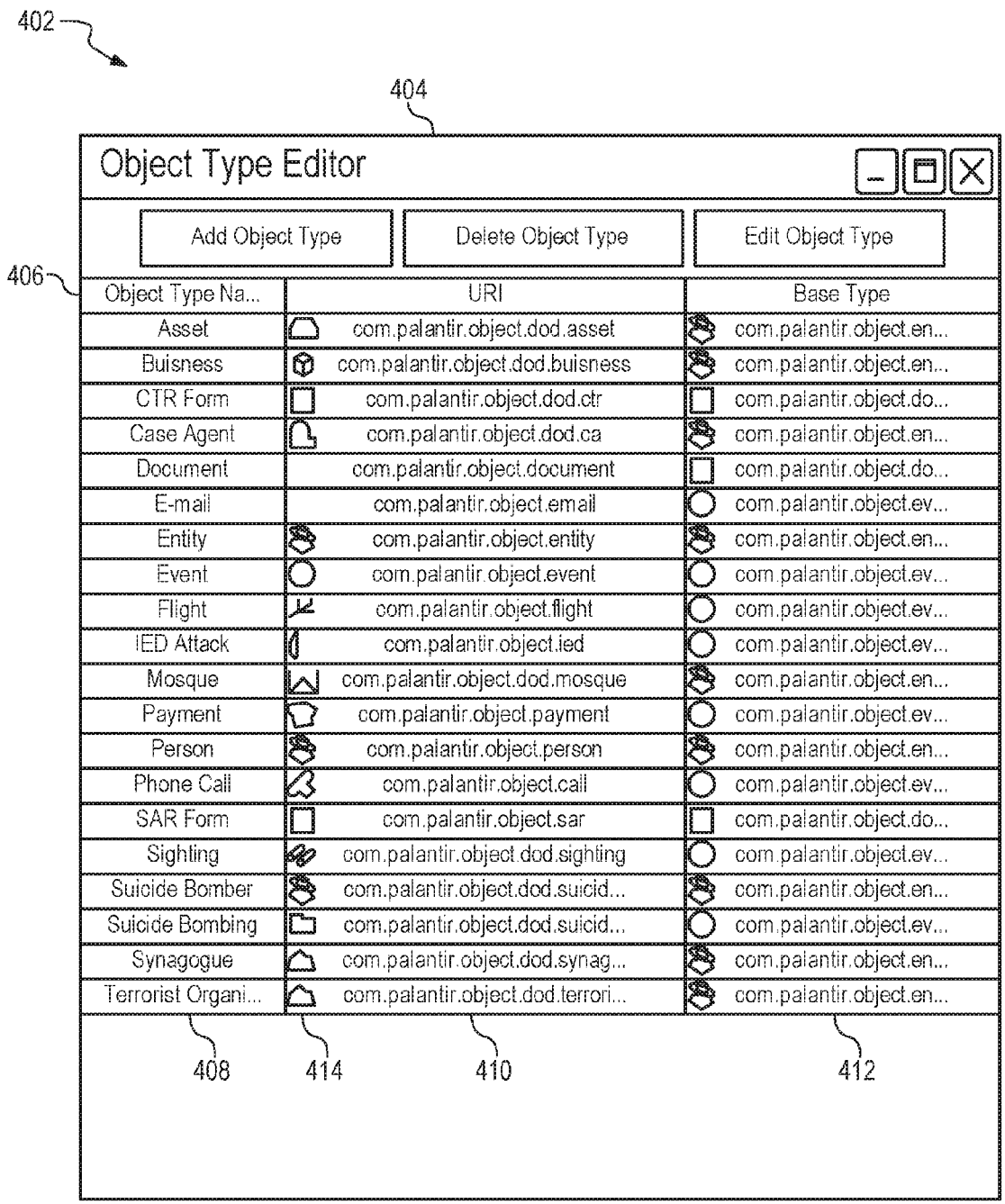
FIG. 4 illustrates an example object type editor.

FIG. 4 illustrates an example object type editor. In an embodiment, an object type editor panel 402 comprises graphical buttons 404 for selecting add, delete, and edit functions, and one or more rows 406 that identify object types and a summary of selected attributes of the object types. Example selected attributes that can be displayed in object editor panel 402 include an object type name 408 (for example, "Business"), a uniform resource identifier (URI) 410 specifying a location of information defining the object type (for example, "com.palantir.object.business"), and a base type 412 of the object type, also expressed in URI format (for example, "com.palantir.object.entity"). Each URI also may include a graphical icon 414.

In an embodiment, a user interacts with a computer to perform the following steps to define an object type. Assume for purposes of an example that the new object type is Vehicle. Using the object type editor, the user selects the "Add Object Type" button 404 and the computer generates and displays a panel that prompts the user to enter values for a new object type. The user selects a base object type of Entity, which may comprise any person, place or thing. The user assigns a graphical icon to the Vehicle object type. The user assigns a display name of "Vehicle" to the object type.

In an embodiment, a user interacts with the computer to define a property type in a similar manner. The user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property.

In various embodiments, validators may comprise regular expressions, a set of fixed values, or a code module. For example, a property type that is a number may have a validator comprising a regular expression that matches digits 0 to 9. As another example, a property type that is a US state may have a validator that comprises the set {AK, AL, CA . . . VA} of valid two-letter postal abbreviations for states. Validator sets may be extendible to allow a user to add further values. A property type may have component elements, and each component element may have a different validator. For example, a property type of "Address" may comprise as components "City", "State", and "ZIP", each of which may have a different validator.

In an embodiment, defining a property type includes identifying one or more associated words for the property type. The associated words support search functions in large database systems. For example, a property type of "Address" may have an associated word of "home" so that a search in the system for "home" properties will yield "Address" as one result.

In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 2, creating a parser definition for a property type at step 208 may comprise selecting a parser type such as a regular expression, code module, or other parser type. When the parser type is "code module," then a user specifies the name of a particular code module, script, or other functional element that can perform parsing for the associated property type.

Figure 5A:
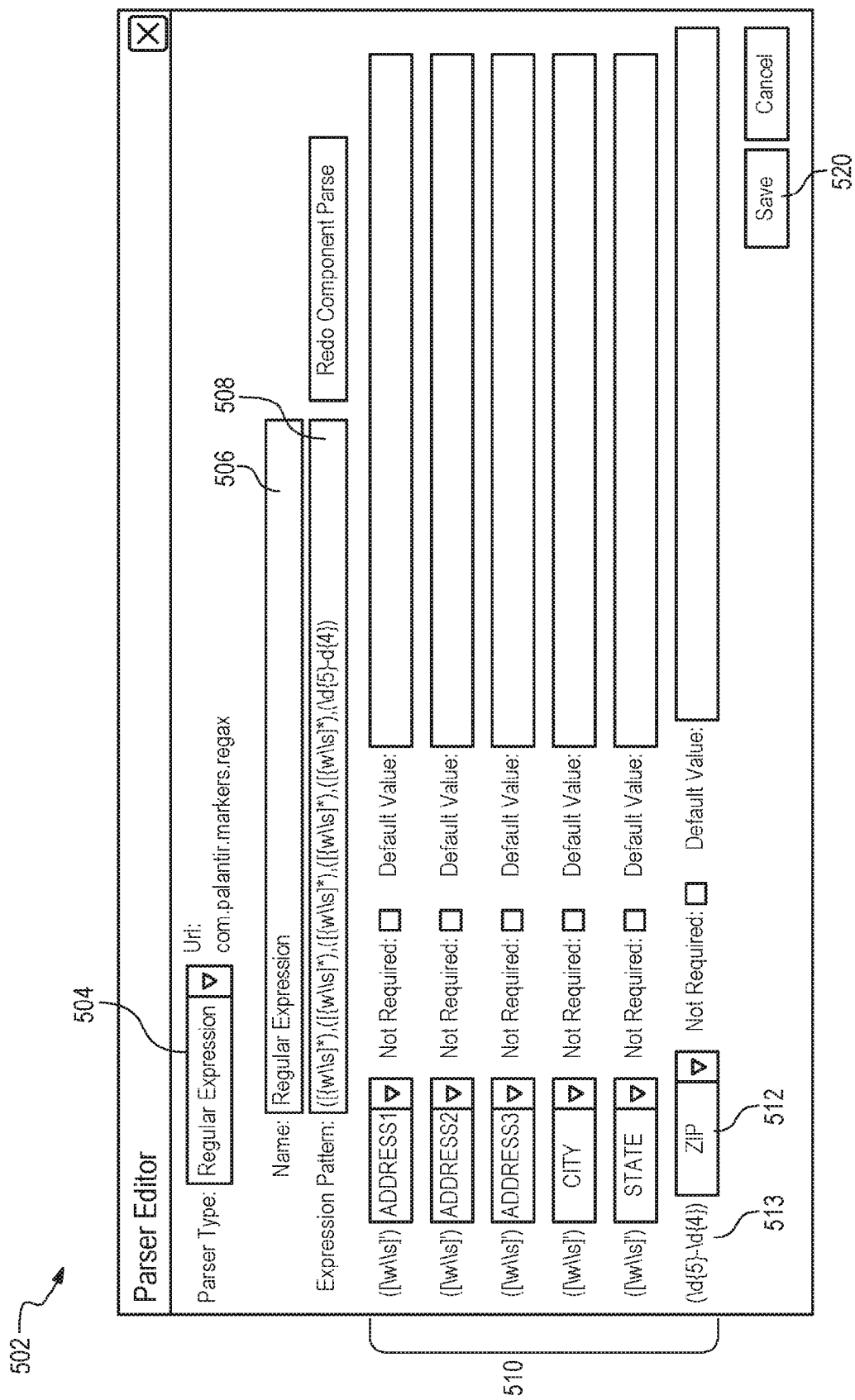
FIG. 5A illustrates an example parser editor.

In an embodiment, defining a property type includes creating a definition of a parser for the property type using a parser editor. FIG. 5A illustrates an example parser editor user interface screen display. In an embodiment, screen display 502 comprises a Parser Type combo box 504 that can receive a user selection of a parser type, such as "Regular Expression" or "Code Module." Screen display 502 further comprises a Name text entry box 506 that can receive a user-specified name for the parser definition.

When the parser type is "regular expression," steps 214-220 are performed. At step 214, regular expression text is specified. For example, when the Parser Type value of combo box 504 is "Regular Expression," screen display 502 comprises an Expression Pattern text box 508 that can receive a user entry of regular expression pattern text.

In step 216, a property type component and a matching sub-definition of regular expression text is specified. For example, screen display 502 further comprises one or more property type component mappings 510. Each property type component mapping associates a sub-definition of the regular expression pattern text with the property type component that is shown in a combo box 512. A user specifies a property type component by selecting a property type component using combo box 512 for an associated sub-definition 513. As shown in step 218, specifying a property type component and sub-definition of regular expression text may be repeated for all other property type components of a particular property type. As seen in the example of FIG. 5A, six (6) property type component mappings 510 have been created for different property types (ADDRESS1, ADDRESS2, ADDRESS3, CITY, STATE, ZIP).

In step 220, a user may specify one or more constraints, default values, and/or other attributes of a parser definition. In the example of FIG. 5A, the user also may specify that a match to a particular property type component is not required by checking a "Not Required" check box 514. Screen display 502 may further comprise a Default Value text box 514 that can receive user input for a default value for the property type component. If a Default Value is specified, then the associated property type receives that value if no match occurs for associated grouping of the regular expression. In alternative embodiments, other constraints may be specified.

At step 222, the parser definition is stored in association with a property type. For example, selecting the SAVE button 520 of FIG. 5A causes storing a parser definition based on the values entered in screen display 502. Parser definitions may be stored in database 108.

For purposes of illustrating a clear example, the approach of FIG. 2 has been described with reference to FIG. 5A. However, the approach of FIG. 2 may be implemented using other mechanisms for creating and specifying the values and elements identified in FIG. 2, and the particular GUI of FIG. 5A is not required.

III. Creating Data in a Database Using a Dynamic Ontology

Figure 3:
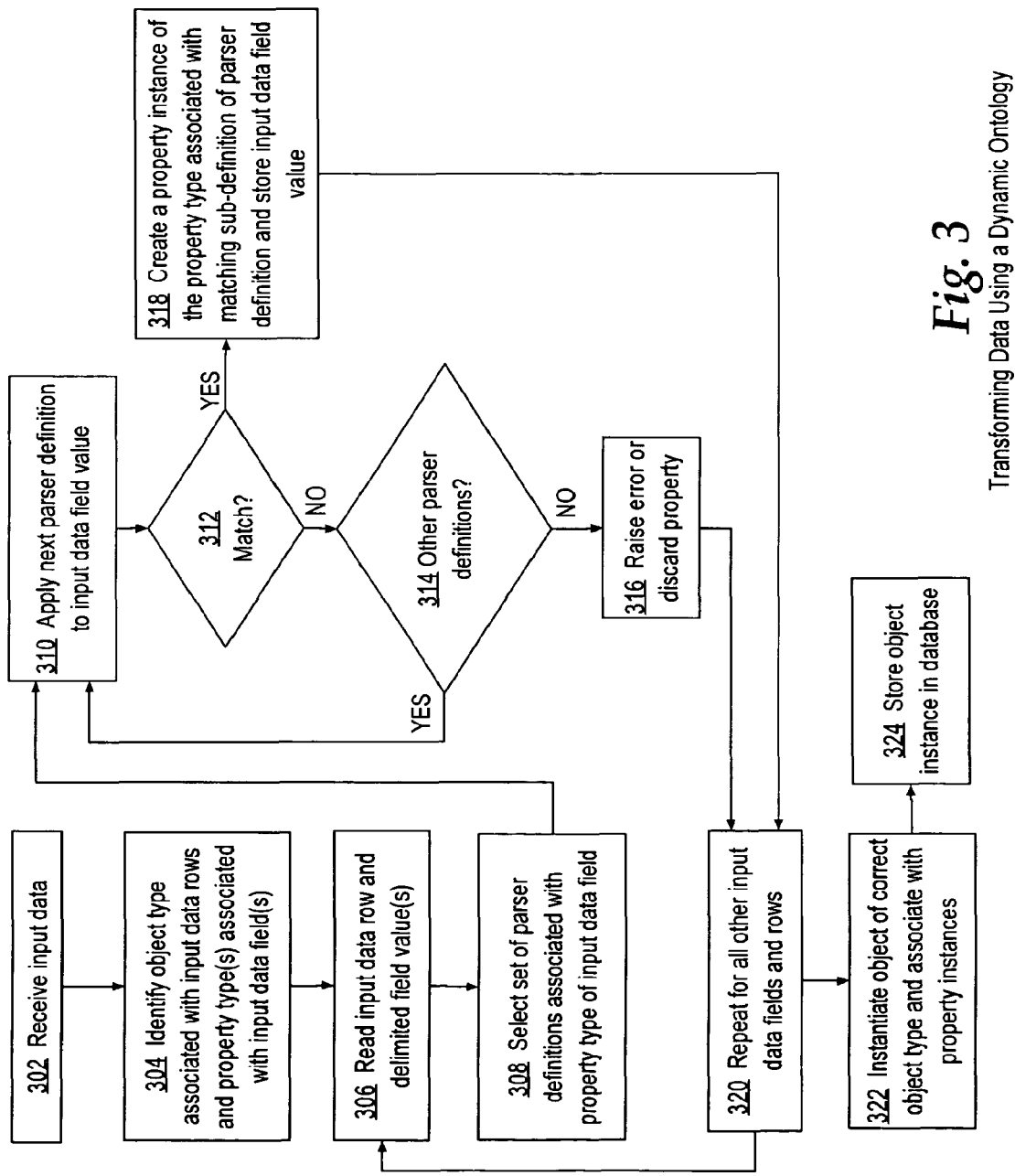
FIG. 3 illustrates a method of transforming data and creating the data in a data store using a dynamic ontology.

FIG. 3 illustrates a method of transforming data and creating the data in a database using a dynamic ontology. For purposes of illustrating a clear example, the approach of FIG. 3 is described herein with reference to FIG. 1. However, the approach of FIG. 3 may be implemented using other mechanisms for performing the functional steps of FIG. 3, and the particular system of FIG. 1 is not required.

In step 302, input data is received. In an embodiment, an input data file is received. The input data file may comprise a comma-separated value (CSV) file, a spreadsheet, XML or other input data file format. Input data 100 of FIG. 1 may represent such file formats or any other form of input data.

In step 304, an object type associated with input data rows of the input data is identified, and one or more property types associated with input data fields of the input data are identified. For example, the object-property mapping 101 of FIG. 1 specifies that input data 100 comprises rows corresponding to object type PERSON and fields corresponding to property type components LAST_NAME, FIRST_NAME of property type NAME. The object-property mapping 101 may be integrated into input data 100 or may be stored as metadata in association with a data input tool.

In step 306, a row of data is read from the input data, and one or more field values are identified based on delimiters or other field identifiers in the input data.

In step 308, a set of parser definitions associated with the property type of a particular input data field is selected. For example, metadata stored as part of creating a property type specifies a set of parser definitions, as previously described in connection with FIG. 5A.

In step 310, the next parser definition is applied to an input data field value. Thus, data fields are read from each row of the file and matched to each parser that has been defined for the corresponding property types. For example, assume that the mapping indicates that an input data CSV file comprises (Last Name, First Name) values for Name properties of Person objects. Data fields are read from the input data CSV file and compared to each of the parsers that has been defined for the Name property type given the First Name field and Last Name field. If a match occurs for a (Last Name, First Name) pair value to any of the parsers for the Name property type, then the parser transforms the input data pair of (,Last Name, First Name) into modified input data to be stored in an instantiation of a Name property.

If applying a definition at step 310 results in a match to the input data, as tested at step 312, then at step 318 a property instance is created, and the input data field value is stored in a property of the property type associated with the matching sub-definition of the parser definition. For example, referring to FIG. 5A, assume that the input data matches the regular expression 508 for an ADDRESS value. The mapping 510 specifies how to store the data matching each grouping of the regular expression into a component of the ADDRESS property. In response, an instance of an ADDRESS property is created in computer memory and the matching modified input data value is stored in each component of the property instance.

Figure 5B:
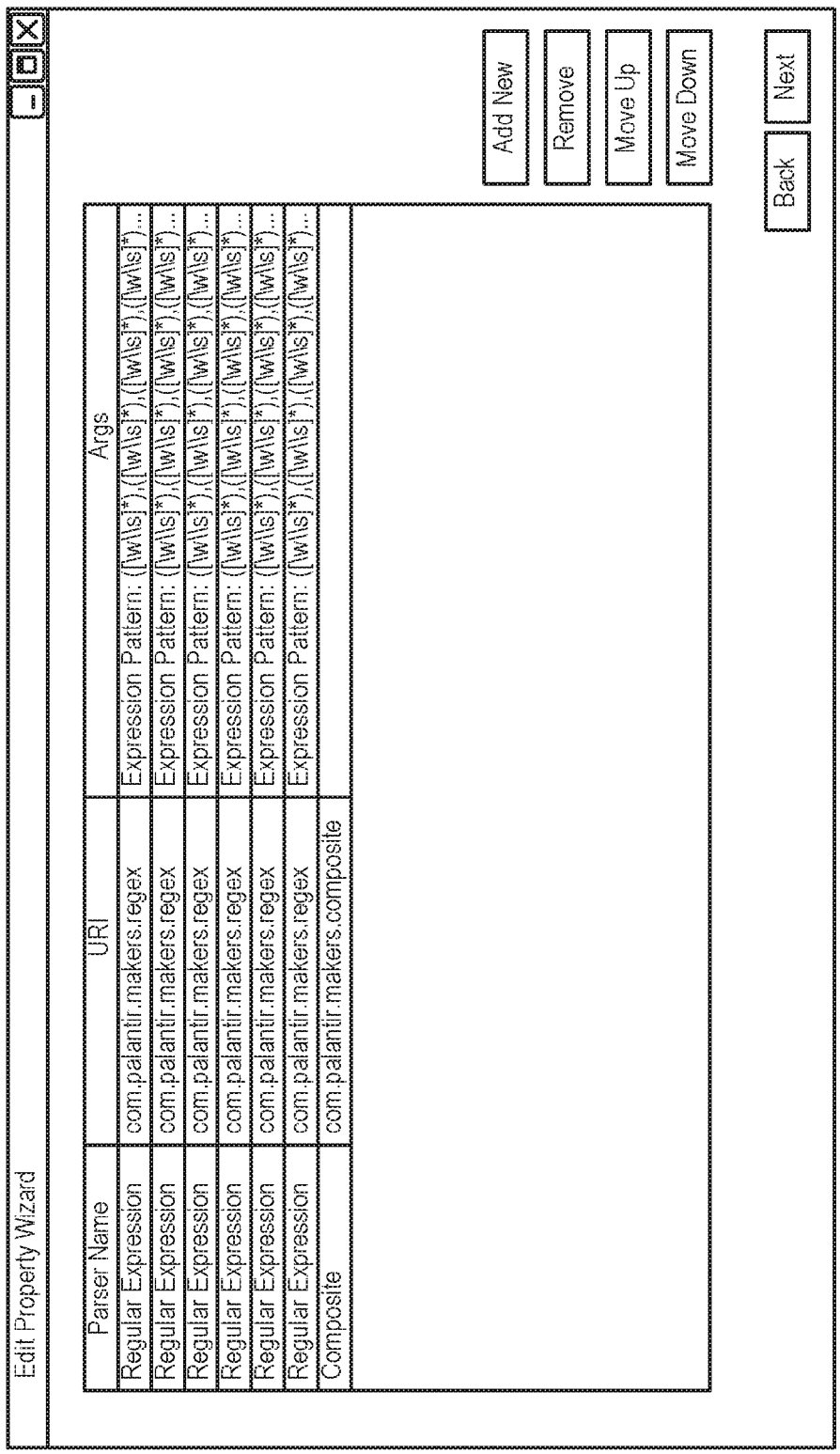
FIG. 5B illustrates an example property editing wizard in which multiple parsers have been created for a particular property.

If no match occurs at step 312, then control transfers to step 314 to test whether other parser definitions match the same input data value. FIG. 5B illustrates an example property editing wizard in which multiple parsers have been created for a particular property, and through the loop shown in FIG. 3, each of the multiple parsers can be used in matching input data. If no match occurs to the given parser definition, then any other parser definitions for that property type are matched until either no match occurs, or no other parser definitions are available.

If a grouping is empty, then the component is filled by the default value for that component, if it exists. If no other parser definitions are available, then control transfers from step 314 to step 316, at which point an error is raised or the property is discarded At step 320, the preceding steps are repeated for all other values and rows in the input data until the process has transformed all the input data into properties in memory.

At step 322, an object of the correct object type is instantiated. For example, the object-property mapping 101 may specify an object type for particular input data, and that type of object is instantiated. The newly created object is associated in memory with the properties that are already in memory. The resulting object is stored in the database in step 324.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

IV. Example Implementation Hardware

Figure 6:
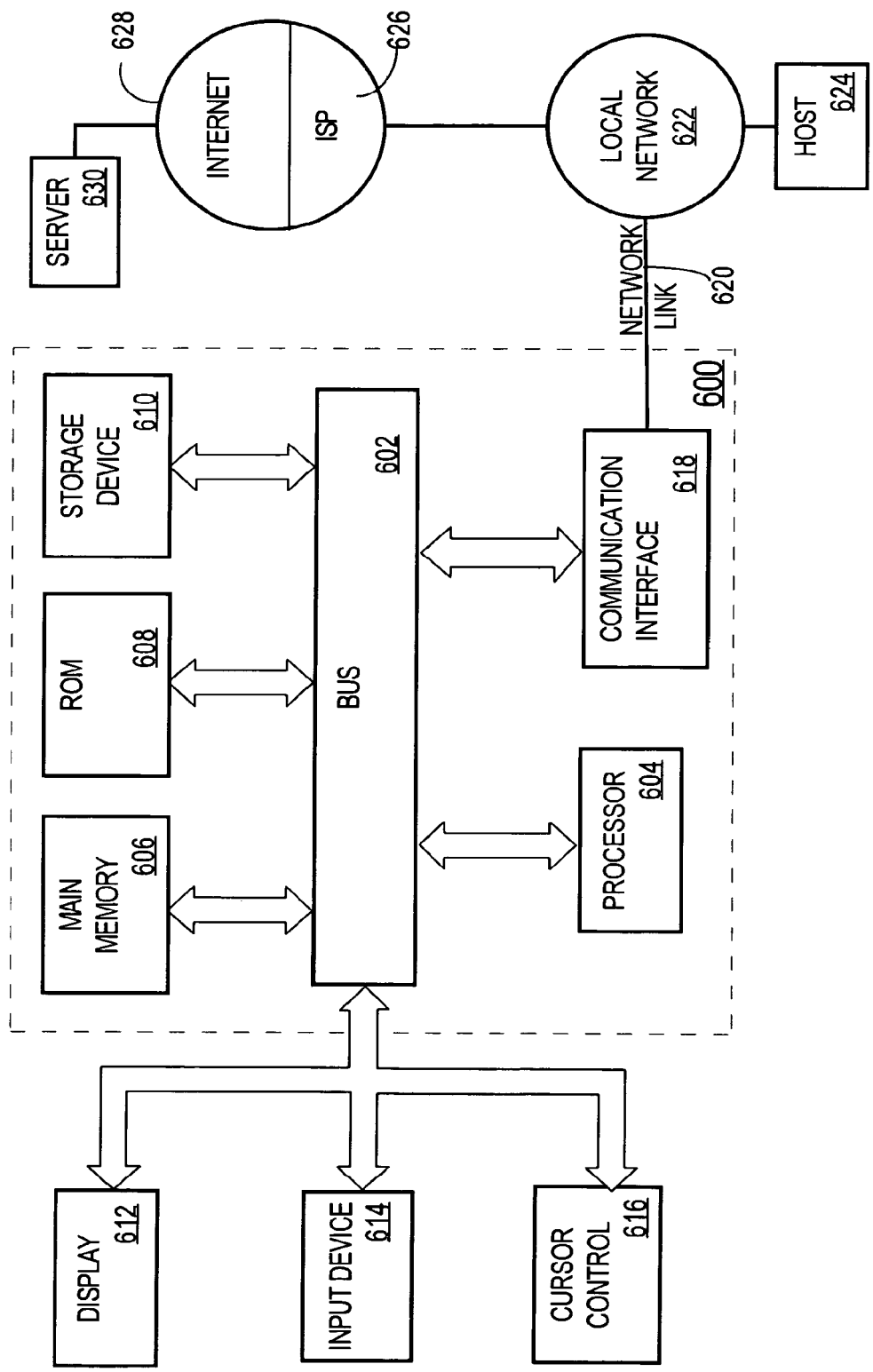
FIG. 6 illustrates a computer system with which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
storing a plurality of parser definitions, wherein each parser definition is associated with an object type, wherein a particular parser definition of the one or more parser definitions comprises two or more parser sub-definitions, wherein a first parser sub-definition of the two or more parser sub-definitions is associated with a first property type, and wherein a second parser sub-definition of the two or more parser sub-definitions is associated with a second property type, wherein at least the first property type is a composite type that includes two or more of a string component, a date component, or a number component, by:
displaying, on a computer display device using a user interface screen display, a text box that can receive a user entry of regular expression pattern text;
creating and storing a plurality of property type component mappings that associate sub-definitions of the regular expression pattern text with property type components by selecting from a combo box in the user interface screen display, wherein the two or more parser sub-definitions comprise the sub-definitions of the regular expression pattern text;
determining whether input data matches the particular parser definition;
based at least in part on determining that the input data matches the particular parser definition:
creating at least a first property instance of the first property type and a second property instance of the second property type;
storing first data corresponding to a first portion of the input data in the first property instance, wherein the first portion of the input data and the corresponding first data each include two or more of string data, date data, or number data;
storing second data based on a second portion of the input data in the second property instance;
wherein the method is performed by one or more computing devices.

2. The method of claim 1, wherein each of the two or more parser sub-definitions is a syntactic pattern that is referenced by the regular expression pattern text.

3. The method of claim 1, wherein the particular parser definition is the regular expression pattern text and references the first property type as a token.

4. The method of claim 1, further comprising:
storing a validator for the first property type, wherein the validator defines valid data for the first property type;
determining whether the first data matches the validator before storing the first data in the first property instance.

5. The method of claim 4, wherein the validator is one or more of: an expression that defines a range of valid data, a set of valid data, or a code module that, when executed against particular input data, determines whether the particular input data matches a specified syntax or data model.

6. The method of claim 1, wherein the composite type consists of a string component and a number component, and wherein the first portion of the input data and the corresponding first data each consist of string data and number data.

7. The method of claim 1, wherein the particular parser definition comprises a particular sub-definition that is associated with a particular property type, wherein the particular property type comprises a particular component that is not required to match any portion of the input data when determining whether the input data matches the particular parser definition.

8. The method of claim 1, further comprising transforming the first portion of the input data to the first data, wherein the first portion is not valid for the first property type before the first portion is transformed to the first data, and wherein the first data is valid for the first property type after the first portion is transformed to the first data.

9. A computer system comprising:
one or more processors;
one or more non-transitory computer-readable storage media storing instructions, which, when executed by the one or more processors, cause:
storing a plurality of parser definitions, wherein each parser definition is associated with an object type, wherein a particular parser definition of the one or more parser definitions comprises two or more parser sub-definitions, wherein a first parser sub-definition of the two or more parser sub-definitions is associated with a first property type, and wherein a second parser sub-definition of the two or more parser sub-definitions is associated with a second property type, wherein at least the first property type is a composite type that includes two or more of a string component, a date component, or a number component, by:
- displaying, on a computer display device using a user interface screen display, a text box that can receive a user entry of regular expression pattern text;
- creating and storing a plurality of property type component mappings that associate sub-definitions of the regular expression pattern text with property type components by selecting from a combo box in the user interface screen display, wherein the two or more parser sub-definitions comprise the sub-definitions of the regular expression pattern text;
- determining whether input data matches the particular parser definition;
- based at least in part on determining that the input data matches the particular parser definition:
- creating at least a first property instance of the first property type and a second property instance of the second property type;
- storing first data corresponding to a first portion of the input data in the first property instance, wherein the first portion of the input data and the corresponding first data each include two or more of string data, date data, or number data;
- storing second data based on a second portion of the input data in the second property instance.

10. The computer system of claim 9, wherein each of the two or more parser sub-definitions is a syntactic pattern that is referenced by the regular expression pattern text.

11. The computer system of claim 9, wherein the particular parser definition is the regular expression pattern text and references the first property type as a token.

12. The computer system of claim 9, wherein the instructions, when executed by the one or more processors, further cause:
- storing a validator for the first property type, wherein the validator defines valid data for the first property type;
- determining whether the first data matches the validator before storing the first data in the first property instance.

13. The computer system of claim 12, wherein the validator is one or more of: an expression that defines a range of valid data, a set of valid data, or a code module that, when executed against particular input data, determines whether the particular input data matches a specified syntax or data model.

14. The computer system of claim 9, wherein the composite type consists of a string component and a number component, and wherein the first portion of the input data and the corresponding first data each consist of string data and number data.

15. The computer system of claim 9, wherein the particular parser definition comprises a particular sub-definition that is associated with a particular property type, wherein the particular property type comprises a particular component that is not required to match any portion of the input data when determining whether the input data matches the particular parser definition.

16. The computer system of claim 9, wherein the instructions, when executed by the one or more processors, further cause transforming the first portion of the input data to the first data, wherein the first portion is not valid for the first property type before the first portion is transformed to the first data, and wherein the first data is valid for the first property type after the first portion is transformed to the first data.

17. The method of claim 1, further comprising, using the user interface screen display, receiving input specifying one or more constraints, default values and other attributes of a parser definition.

18. The method of claim 17, wherein the input specifying one or more constraints, default values and other attributes of a parser definition comprises an indication that a match to a particular property type component is not required.

19. The computer system of claim 9, wherein the one or more non-transitory computer-readable storage media further store instructions, which, when executed by the one or more processors, cause: using the user interface screen display, receiving input specifying one or more constraints, default values and other attributes of a parser definition.

20. The computer system of claim 19, wherein the input specifying one or more constraints, default values and other attributes of a parser definition comprises an indication that a match to a particular property type component is not required.

* * * * *